Patented Apr. 16, 1946

2,398,736

UNITED STATES PATENT OFFICE 2,398,736

POLYMERIC PRODUCTS AND PREPARATION OF SAME

Robert R. Dreisbach, Midland, Mich., assignor to The Dow Chemical Company, Midland, Mich., a corporation of Michigan No Drawing. Application March 4, 1944, Serial No. 525,092

8 Claims. (Cl. 260—74)

This invention concerns certain new thermoplastic copolymers composed for the most part of styrene, but having mechanical properties superior to those of polystyrene which has been prepared under similar polymerization conditions.

The new copolymers are prepared by polymerizing styrene together with from 0.03 to 5.0 and preferably from 0.03 to 1.5 per cent by weight of one or more nuclear halogenated styrenes. The copolymers are clear, transparent, colorless thermoplastic solids which may be molded, extruded, or machined to obtain finished articles of desired size and shape. They possess excellent dielectric properties and are useful as electric insulating agents. They have a luster and a general appearance similar to that of the usual solid form of polystyrene. However, in most instances they resist distortion under a transversely applied load at temperatures higher than does polystyrene which has been prepared in a similar manner, and they are superior to the polystyrene in one or more other mechanical properties such as impact strength, tensile strength, hardness, i. e. resistance to scratching, etc. Accordingly, the new copolymers are better adapted for many purposes than is polystyrene.

The invention is based upon a discovery that by admixing a small amount of a nuclear halogenated styrene with styrene prior to polymerizing the latter, products may be obtained having a higher heat-distortion temperature and improved mechanical properties over those obtained by polymerizing styrene alone under like conditions. However, in order to obtain products having such improved properties, without the need for employing a considerable proportion of the halogenated styrene as a starting material, it is important that the polymerization mixture contain not more than 5 per cent by weight of halogenated styrene, based on the combined weight of the styrene and the nuclear halogenated styrene.

In general, the heat distortion temperature becomes lower and the mechanical properties of the copolymer products become poorer as the proportion of nuclear halogenated styrene chemically combined therein is decreased from 0.03 per cent to zero, or is increased above 5 per cent, e. g. from 5 up to 15 per cent by weight. Within the limits of from 0.03 to 5 per cent of the nuclear halogenated compound in the coplymer product, the optimum proportion varies somewhat depending upon the particular nuclear halogenated styrene employed. For instance, copolymers of styrene and para-chloro-styrene containing from 0.5 to 5 per cent of the latter are superior, as regards one or more of the aforementioned properties, to polystyrene itself, and the properties are optimum when the product contains about one per cent of para-chloro-styrene. The copolymers of styrene and dichloro-styrene which contain from 0.03 to 0.5 per cent of the latter have higher heat distortion temperatures and better mechanical properties than the copolymers containing either less or a somewhat greater proportion of the dichloro-styrene. Regardless of the particular nuclear halogenated styrenes employed in preparing the copolymers, the latter resist distortion at higher temperatures than does polystyrene prepared under similar polymerizing conditions when they contain in chemically combined form from 0.03 to 1.5 per cent of the nuclear halogenated styrene.

By employing a considerable proportion, e. g. 15 per cent by weight or more, of a halogenated styrene in the mixture of polymerizable compounds, products may in some instances be produced having heat distortion temperatures and mechanical properties as good as those of the products prepared from the mixture containing 5 per cent by weight or less of the halogenated styrene. However, the nuclear halogenated styrenes are more expensive and difficult to prepare than is styrene; hence, the employment of such considerable proportion of a halogenated styrene is disadvantageous.

The copolymeric products are prepared by adding one or more nuclear halogenated styrenes, such as monochlorostyrene, monobromostyrene, dichlorostyrene or dibromostyrene, etc., to styrene in amount such as to form a mixture containing from 0.03 to 5 per cent, and usually from 0.03 to 1.5 per cent, of the halogenated styrene, based on the combined weight of the polymerizable compounds. The mixture may be polymerized in any of the usual ways such as by heating the same or by exposure to actinic light, or by forming an aqueous emulsion of the polymerizable compounds and polymerizing the latter while in the emulsion, etc. Regardless of how the polymerization is carried out, the polymeric product is superior in mechanical properties to polystyrene which has been prepared in like manner. Usually the mixture of polymerizable compounds is heated in a closed container, e. g. at temperatures of from 70° to 150° C., to effect the polymerization. Polymerization en masse may, if desired, be carried out within a mold so as to obtain directly a finished article of desired size and shape. The product may, if desired, be molded, extruded, or machined to produce finished articles in the ways usual with polystyrene. Articles prepared from the product are superior to polystyrene in at least one, and usually several, mechanical properties such as tensile strength, impact strength, resistance to scratching of the surface, and resistance to distortion by an applied force at temperatures higher than those at which polystyrene resists distortion.

The following examples illustrate certain ways in which the principle of the invention has been applied, but are not to be construed as limiting the invention.

EXAMPLE 1

In each of a series of experiments para-chlorostyrene was admixed with styrene in the proportions indicated in the following table and the mixture was polymerized by heating the same in a closed container at a temperature of 125° C. for three days. The solid polymeric product was then removed, crushed to form granules of size suitable for molding and was molded into standard test pieces. The test pieces were used in determining in the usual ways, the tensile strength in pounds per square inch cross section; the impact strength in inch-pounds of energy applied by a blow to cause breakage; the Shore Scleroscope hardness; the heat distortion temperature in degrees centigrade; and the per cent electric power factor. It may be mentioned that, except for the size of the test piece, the methods used in determining the impact strength and the heat distortion temperature are similar to those described in A. S. T. M. D 256–34T and A. S. T. M. D 48–33, respectively. The following table states the per cent by weight of para-chloro-styrene in each mixture subjected to polymerization and gives the foregoing properties of the polymerized product. For purpose of comparison certain products prepared from mixtures of styrene and para-chloro-styrene, but having compositions outside the range comprised by the invention, are included in the table.

Table I

| Run No. | Per cent styrene | Per cent chlorostyrene | Heat distortion temp., °C. | Tensile strength, lbs. per sq. in. | Impact strength, in lbs. | Shore hardness | Per cent power factor |
|---|---|---|---|---|---|---|---|
| 1 | 100 | 0 | 80 | 5,400 | 0.9 | 79 | 0.03 |
| 2 | 99 | 1 | 84 | 6,600 | 1.0 | 80 | 0.07 |
| 3 | 95 | 5 | 82 | 6,100 | 0.9 | 82 | 0.035 |
| 4 | 85 | 15 | 79 | | | | |
| 5 | 75 | 25 | 79.4 | 6,540 | 1.1 | 85 | 0.093 |
| 6 | 50 | 50 | 82 | 6,710 | 1.2 | 88 | 0.103 |
| 7 | 25 | 75 | 85 | 7,800 | 0.5 | 92 | 0.1 |
| 8 | 0 | 100 | 95 | 9,120 | 1.1 | 95 | 0.12 |

EXAMPLE 2

Dichlorostyrene was prepared by brominating ortho-dichloro-benzene to form mono-bromo-dichlorobenzene, reacting the latter with magnesium to form the Grignard reagent, reacting said agent with ethylene oxide to form dichlorophenyl-ethyl alcohol, and dehydrating the alcohol. The dichlorostyrene was added in varying amounts to different samples of styrene. The resultant mixtures were polymerized by heating the same in closed containers at 125° C. for 3 days. Each polymerized product was molded into test pieces, and the latter were employed in determining the mechanical properties of the product, as in Example 1. The following table states the composition of each mixture subjected to polymerization and gives the heat distortion temperature, the tensile strength, the impact strength, and the per cent power factor of each polymer product. Products having compositions outside the range required by the invention are included in the table for purpose of comparison.

Table II

| Run No. | Per cent styrene | Per cent dichlorostyrene | Heat distortion temp., °C. | Tensile strength, lbs. per sq. in. | Impact strength, in. lbs. | Per cent power factor |
|---|---|---|---|---|---|---|
| 1 | 100 | 0 | 76 | 4,500 | 0.7 | 0.15 |
| 2 | 99.95 | 0.05 | 106 | 7,700 | 1.3 | 0.092 |
| 3 | 99.9 | 0.1 | 104 | 8,300 | 1.2 | 0.82 |
| 4 | 99.5 | 0.5 | 104 | 5,650 | 1.0 | 0.114 |
| 5 | 99.0 | 1.0 | 88 | 2,800 | 1.5 | 0.129 |
| 6 | 95.0 | 5.0 | 71 | 4,700 | 0.7 | 0.15 |
| 7 | 75.0 | 25.0 | 71 | 6,000 | 0.7 | 0.47 |
| 8 | 0 | 100 | 72 | 2,100 | 0.5 | 1.38 |

Other modes of applying the principle of the invention may be employed instead of those explained, change being made as regards the products herein disclosed, provided the compounds stated by any of the following claims or the equivalent of such stated compounds be employed.

I therefore particularly point out and distinctly claim as my invention:

1. A solid thermoplastic copolymer of styrene and a nuclear halogenated styrene having not more than two halogen atoms in the molecule, which copolymer contains in chemically combined form between 0.03 and 5 per cent by weight of the nuclear halogenated styrene.

2. A solid thermoplastic copolymer of styrene and a nuclear halogenated styrene having not more than two halogen atoms in the molecule, which copolymer contains in chemically combined form between 0.03 and 1.5 per cent by weight of the nuclear halogenated styrene.

3. A solid thermoplastic copolymer of styrene and a nuclear chlorinated styrene having not more than two chlorine atoms in the molecule, which copolymer contains in chemically combined form between 0.03 and 5 per cent by weight of the nuclear chlorinated styrene.

4. A solid thermoplastic copolymer of styrene and a nuclear chlorinated styrene having not more than two chlorine atoms in the molecule, which copolymer contains in chemically combined form between 0.03 and 1.5 per cent by weight of the nuclear chlorinated styrene.

5. A solid thermoplastic copolymer of styrene and a mono-chloro-styrene having a single chlorine atom in the aromatic nucleus, which copolymer contains in chemically combined form between 0.03 and 5 per cent by weight of the mono-chloro-styrene.

6. A solid thermoplastic copolymer of styrene and para-chloro-styrene, which copolymer contains in chemically combined form between 0.03 and 5 per cent by weight of para-chloro-styrene.

7. A solid thermoplastic copolymer of styrene and nuclear dichlorinated styrene, which copolymer contains in chemically combined form between 0.03 and 1.5 per cent by weight of the dichloro-styrene.

8. A solid thermoplastic copolymer of styrene and nuclear dichlorinated styrene, which copolymer contains in chemically combined form between 0.03 and 0.5 per cent by weight of the dichloro-styrene.

ROBERT R. DREISBACH.